Oct. 12, 1965  A. M. SAMBORSKY ETAL  3,210,989
CENTER OF GRAVITY LOCATING APPARATUS
Filed Jan. 30, 1964
FIG. 1
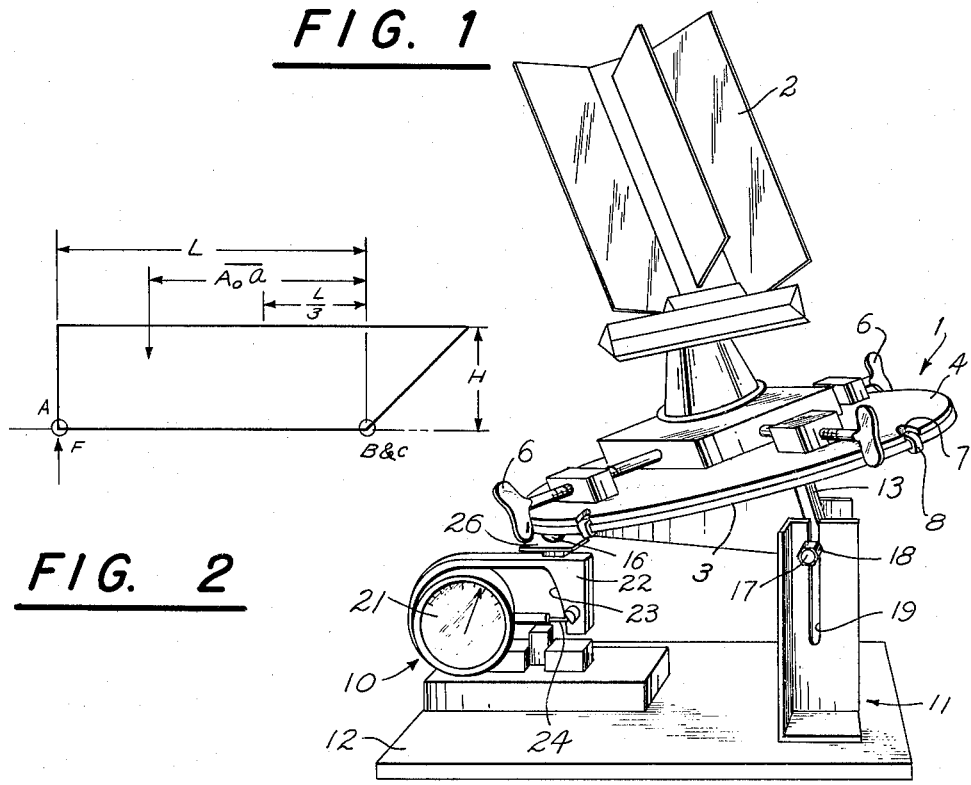
FIG. 2
FIG. 3
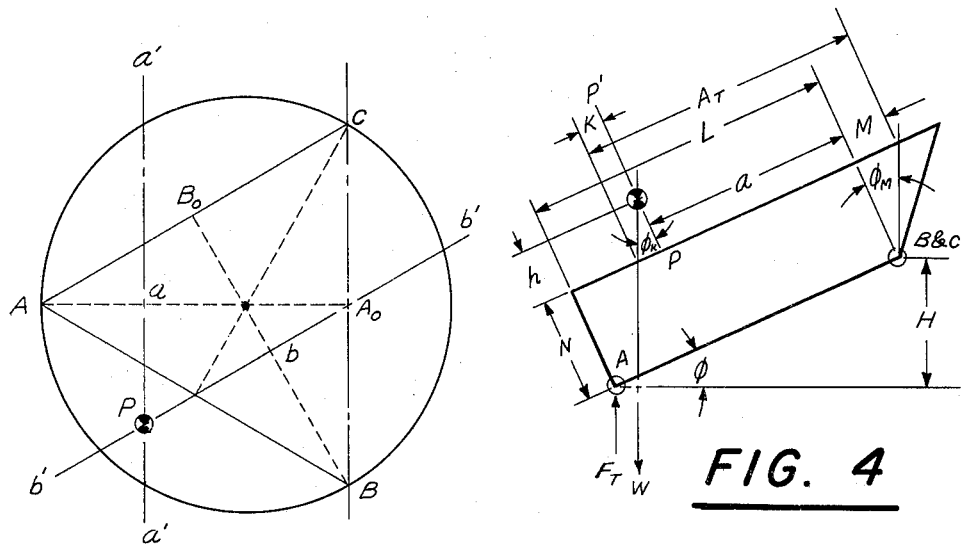
FIG. 4
INVENTORS
ANDREW M. SAMBORSKY
JOSEPH F. KING
BY
ATTORNEYS 3,210,989
CENTER OF GRAVITY LOCATING APPARATUS
Andrew M. Samborsky, 9565 Janfred Way, La Mesa,
Calif., and Joseph F. King, 4639 Chickasaw Court,
San Diego, Calif.
Filed Jan. 30, 1964, Ser. No. 341,465
4 Claims. (Cl. 73—65)
(Granted under Title 35, U.S. Code (1952), sec. 266)

The invention described herein may be manufactured and used by or for the Government of the United states of America for governmental purposes without the payment of any royalties thereon or therefor.

The present invention relates generally to apparatus for locating the center of gravity of a body and in particular, a three dimensional body having an irregular shape. One conventional manner of making center of gravity determinations involves physically suspending the equipment in a plurality of different planes to ascertain the center of gravity in each plane, usually by a plumb bob and paper measurement method. Other practices involve essentially the same approach except that they look for balance points and then use load cells or the like to determine moment centers. These procedures are rather slow, expensive crude and, frequently, unreliable, especially when the object under consideration is irregularly shaped or difficult to handle so that balance points cannot readily be ascertained. It is recognized that there are a number of specialized equipments designed particularly for certain center of gravity determinations of particular objects such as missiles, aircraft loads and others which have known shapes around which the locating apparatus can be designed. However, such specialized equipments obviously do not have general utility and, furthermore, many of these equipments also are quite complex and difficult to use.

It is therefore an object of the present invention to provide a center of gravity locating apparatus having general applicability in determining the center of gravity of variety of irregularly shaped objects.

Another object is to provide a gravity center locator capable of relatively rapid and accurate determinations.

Yet another object is to provide apparatus of the type under consideration, the apparatus itself being of an unusually simple, sturdy and inexpensive construction and being capable of reliable use by relatively unskilled personnel.

Other objects and their attendant advantages will become more apparent in the ensuing detailed description.

Generally considered, the objects of the invention are achieved by providing a tiltable platform on which the object under consideration can be mounted. The platform, in effect, is supported on a two-point support, one of these points being provided by an appropriate weight indicator, such as a spring balance, a load-cell or the like, and the other of the points being provided by a standard on which the platform can be vertically adjusted. Preferably, the support points are spaced at opposite sides of the platform so that vertical adjustment of the standard causes the platform to tilt about its single point contact with the weight indicator support as a fulcrum.

Also, the platform is rotatable about a vertical axis so that spaced points of the platform can be indexed directly on the weight indicator means. In use the platform first is disposed in a horizontal plane to permit the determination of force measurements for a plurality of fixed rotated position, these force measurements then permitting the determination of the coordinates which define the horizontal center of gravity of the platform and its supported load. The platform then can be tilted and another force measurement taken, this measurement then enabling the calculation of a third Z coordinate by means of which the actual center of gravity is located. In this regard, it can be noted that center of gravity generally is defined as a point through which the resultant force of gravity (i.e., the weight of the body) acts no matter how the body is oriented.

The invention is illustrated in the accompanying drawings of which FIG. 1 is a perspective view of the apparatus showing an antenna as the body or object to be checked;

FIG. 2 is a schematic illustration of the platform of FIG. 1, this figure being used to define certain dimensions utilized in the calculation of the horizontal center of gravity;

FIG. 3 is a plan view of the table-top also illustrating significant dimensions as well as showing the manner in which the horizontal center of gravity is geometrically located; and FIG. 4 is a view of the platform in a tilted position, this view showing dimensions and angles appropriate to the determination of the Z reference coordinate which, along with the previously-determined horizontal coordinates, actually locates the center of gravity.

Referring to FIG. 1, the illustrated apparatus includes a platform 1 on which is mounted an antenna 2, the center of gravity which is to be determined. Preferably, platform 1 is circular in shape and is formed of a base portion 3 and a rotatable table-top portion 4, portion 4, most suitably, mounting a plurality of set screws 6 by means of which the antenna can be secured in a fixed immovable position. In practice, the position of the object on the platform is so arranged that the anticipated center of gravity will fall somewhere within its periphery.

Top 4 may be rotatably mounted on relatively stationary base 3 in any suitable manner, such as by a tongue and groove interconnection of a type facilitating a free sliding movement one member with respect to the other. Also, as may be noted in FIG. 1, top 4 is provided with three peripheral slots 7 spaced circumferentially 120° one from the other, while stationary base portions 3 carries a spring clip 8, or some other appropriate keying means, capable of springing into an aligned slot 7 so as to hold top 4 in any one of its three indexed positions. Obviously, additional indexed positions can be provided if so desired.

Support for platform 1 is provided by a weight indicating means 10 and by a standard 11, these means being securely carried by a base plate 12 to which they may be bolted or otherwise affixed. The support for the platform essentially is a two-point support, the points being spaced preferably one on one side of the platform and the other on its diametrically opposite side, although, as will be understood, the term two-point support is rather loosely employed to indicate the fact that the platform is tiltable or pivotable about one of these points as a fulcrum. Although the support may be provided in a variety of manners, it is preferred to utilize a bracket 13 secured to the bottom side of platform base 3. Base 3 also is provided at one end with an arcuate, ball-like projection 16 adapted to transmit the weight of the platform and its supported object essentially through a single point to weight indicating means 10. At its other end, bracket 13 mounts a transverse support rod 17 threaded on each of the sides to receive nuts 18 by means of which the bracket may be locked in a vertically adjusted position. As will be noted, standard 11, in effect, is a pair of standards each of which is provided with a vertical slot 19 to receive transverse rod 17.

Weight-indicating means 10 may be provided by any suitable weighting device, although accuracy of the scale is quite important. The illustrated scale, for example, is a commercially obtainable unit known as the Dillon pressure gauge which has an indicator 21 carrying a spring arm 22, the spring arm being formed with a cam surface 23 which bears against a plunger 24. Also, spring arm 22 mounts a small platform 26 which, in its present use, supports arcuate projection member 16 of the platform. The weight of the platform and its supported load bears against spring arm 22 causing its cam surface 23 to operate plunger 24 which, in turn, produces a responsive movement in the arm of indicator 21. Other mechanisms, such as commercially obtainable load cells, may be substituted.

The apparatus is used to obtain certain dimensions and weight measurements from which the coordinates determinative of the center of gravity of the antenna can be ascertained. In general, the arrangement of the apparatus is such that the coordinates defining the horizontal center of gravity of the platform and its supported objects first can be determined with the platform in a horizontal position These coordinates generally are known as the X and Y references. Next, the third dimension needed for the determination of the actual center of gravity can be obtained by moving the apparatus into the position illustrated in FIG. 1. In each of these positions, measurements are taken and forces determined to permit the calculation of the gravity center.

The first step in the procedure for determining the gravity center is to dispose platform 1 in the horizontal position illustrated in FIG. 2 and, with the platform and its supported objects so disposed, take force measurements at each of the three indexed positions fixed by slots 7.

The following formulae then are used to determine the horizontal center of gravity:

$$W = F_A + F_B + F_C$$

$$\overline{A_o a} = \frac{F_A}{W} L$$

$$\overline{B_o b} = \frac{F_B}{W} L$$

In these formulae, W equals the total weight of the platform and its load, while $F_A$, $F_B$ and $F_C$ are the values for the force measurements made at each of the three indices which, as stated, are spaced 120° apart. Length L is the effective total length of the platform between its support points, or, as shown in FIG. 3; L equals $AA_o$, $BB_o$ or $CC_o$. The lengths $\overline{A_o a}$ and $\overline{B_o b}$ are moment arms of $F_A$ and $F_B$ and they also can be referred to as arms $a$ and $b$. In the above formulae, the purpose in mathematically deriving W is to permit the determination of the moment arms.

The horizontal center of gravity then is located by the intersection of planes $a'aa'$ and $b'bb'$, this intersection point being point P of FIG. 3 which, in effect, is the plan view of the line $\overline{PP'}$ perpendicular to platform 1 at the point of intersection. The position of point P then is given in coordinates $a$, $b$, and $c$, although coordinate $c$ primarily provides a check.

After the horizontal center of gravity has been determined, the actual center of gravity is found by deriving a third coordinate referred to as the Z coordinate. This determination is accomplished by tilting the platform from its horizontal position (FIG. 1) to the position shown in FIG. 4. The degree of tilt is not critical since the angle of tilt is mathematically derived rather than measured.

With the platform so tilted, another force measurement, identified in FIG. 4 as $F_{TA}$, is taken. The moment arm of this force is designated $A_T$. The remainder of the physical steps required for the final determination then becomes a matter of measuring two lengths and utilizing other known lengths.

Referring to FIG. 4, the following formulae are used to derive $h$ which is the desired Z reference. Actual center of gravity is given in coordinates $a$, $b$, $h$.

$$\phi = \sin^{-1}\frac{H}{L}$$

$$M = N \tan \phi$$

$$A_T = \frac{F_{TA}}{W} L$$

$$K = A_T - (a+M)$$

$$h = \frac{K}{\tan \phi}$$

The angle of tilt Phi ($\phi$) is determined by measuring height H and solving by using trig tables. If desired, the measurement of height H can be simplified by including a scale on standard 11 of the apparatus, although a caliper-type measurement perhaps is more accurate and, of course, easily taken. Angle $\text{Phi}_m$ ($\phi_M$) equals angle $\phi$ permitting the use of tangent tables to determine the length M, i.e., $M = N \tan \phi$. It also is possible to have $\phi$, H and M as machine constants.

Having previously determined $F_{TA}$, the length of moment arm $A_T$ is derivable, i.e., $$A_T = \frac{F_{TA}}{W} L$$

Knowing the value of $A_T$, and also having previously derived both $a$ and M, a value for K (FIG. 4) is found by using $K = A_T - (a+M)$.

At this point, it is particularly to be noted that angle $\text{Phi}_K$ ($\phi_K$) of FIG. 4 also equals the angle of tilt $\phi$ so that $h$ is derivable from tangent tables as follows, $$h \frac{K}{\tan \phi_k}$$

As already stated, the center of gravity is now given in coordinates $a$, $b$, $h$.

In summation, it will be appreciated that the apparatus itself is quite simple both in construction and use and that, through its use, center of gravity determinations can be made regardless of the shape or size of the object being considered. The determinations are considerably faster and, generally, more accurate than has been possible by the use of previous suspension methods. In the present apparatus, the object is securely fixed in a single position and the only subsequent movements of the objects are made by rotating the platform into its three index positions and by tilting the platform. The calculation of the center of gravity is easily derived simply by making force measurements only. Accuracy has been found to be considerably more reliable than other accepted procedures and, of course, accuracy is not dependent upon precise balancing or other manual functions which require extreme care.

Obviously many modifications and variations of the present invention are possible in the light of the above teachings. It is therefore to be understood that within the scope of the appended claims the invention may be practiced other than as specifically described.

What is claimed is:

1. Apparatus for determining the center of gravity of an irregularly shaped three-dimensional object comprising:
    a circular fixed platform;
    a circular table for fixedly supporting said object, said table being equal in diameter to and coaxially carried by the platform for rotation relative thereto about said axis,
    means for holding the table in a plurality of rotated positions, and
    support means for the platform,
    said means including:
    a force-indicating means disposed beneath and supporting one side of the platform with essentially a single point contact, and a standard disposed beneath the other side of the platform and adapted for raising said other side into a tilted position;

whereby said platform can be disposed in a horizontal plane for determining the horizontal center of gravity coordinates;

said platform then being tiltable enabling the determination of the center of gravity of the object.

2. The apparatus of claim 1 wherein said plurality of rotated positions of said table are spaced circumferentially 120° apart.

3. The apparatus of claim 1 wherein the table is provided with a plurality of peripheral slots spaced circumferentially 120° apart, said means for holding the table in said rotated positions being provided by a clip spring-urged into said slots.

4. Apparatus for determining the center of gravity of an irregularly shaped three-dimensional object comprising:

a fixed normally horizontally disposed platform,
a normally horizontally disposed table for fixedly supporting said object,
said table being carried by said platform and being rotatable relative thereto about the central vertical axis of said normally horizontal table,
means for holding said table in a plurality of rotated positions, and
supporting means for the platform,
said means including:
a force-indicating means disposed beneath and supporting one side of said platform with essentially a single point contact;
extendible means secured beneath the other side of the platform for raising said other side into a tilted position;
whereby said platform can be disposed in a horizontal plane for determining the horizontal center of gravity coordinates;
said platform then being tiltable enabling the determination of the center of gravity of the object.

References Cited by the Examiner
UNITED STATES PATENTS

| | | | |
|---|---|---|---|
| 1,788,824 | 1/31 | Coughtry | 73—65 |
| 2,425,685 | 8/47 | Pinder et al. | 73—65 |

LOUIS R. PRINCE, *Primary Examiner.*